Figure 2:
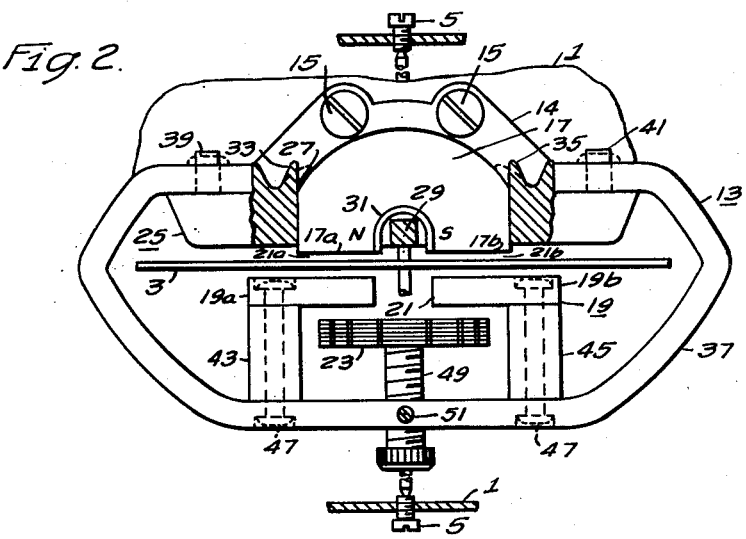

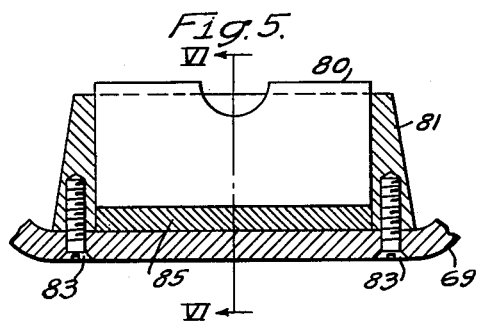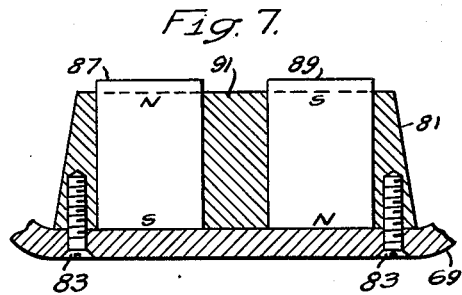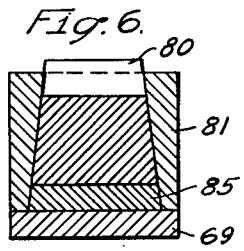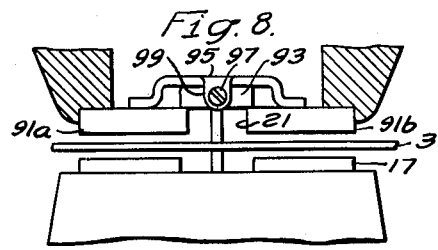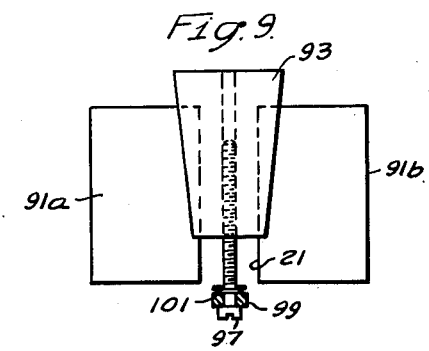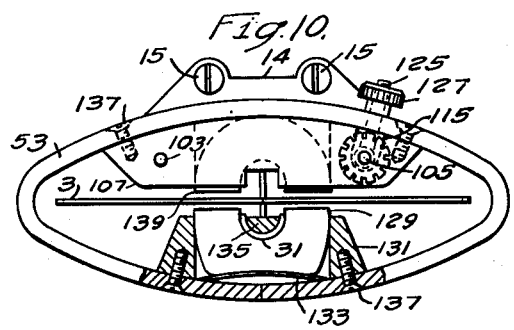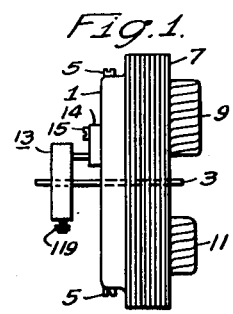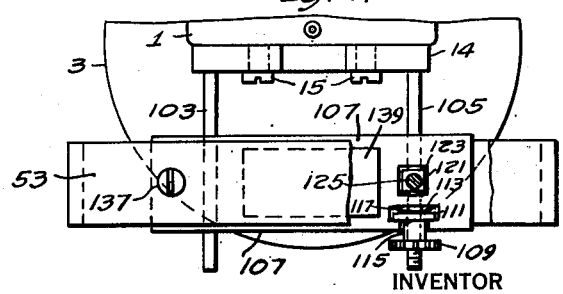

INVENTOR
Thomas D. Barnes
BY
ATTORNEY

Patented July 29, 1952

2,605,301

UNITED STATES PATENT OFFICE 2,605,301

PERMANENT-MAGNET DAMPING ASSEMBLY FOR INTEGRATING METERS

Thomas D. Barnes, Glen Ridge, N. J., assignor to Westinghouse Electric Corporation, East Pittsburgh, Pa., a corporation of Pennsylvania Application December 28, 1946, Serial No. 718,914

15 Claims. (Cl. 171—34)

This invention relates to permanent-magnet assemblies and it has particular relation to permanent-magnet assemblies suitable for damping the rotation of electroconductive discs.

Permanent-magnet assemblies are widely employed in the art for the purpose of damping movement or rotation of the moving element of various devices, such as relays, ammeters, voltmeters and wattmeters. However, for the purpose of discussion, the invention will be described with reference to permanent-magnet assemblies associated with watthour meters for the purpose of damping rotation of the rotor assembly of the watthour meters.

In order to understand the problems solved by the invention, the desiderata for a satisfactory permanent-magnet assembly designed for damping purposes are set forth briefly. Since a watthour meter is designed to measure accurately the energy utilized in an electrical circuit, it is desirable that certain adjustments be provided. Conventionally one of these adjustments is included in the permanent-magnet damping assembly. This adjustment not only should have adequate range, but it should be adjustable within the range in small increments in order to assure accuracy of adjustment. In addition, it is desirable that the permanent-magnet assembly be removable from the associated watthour meter without affecting the calibration adjustment thereof.

External electromagnetic fields of the direct or alternating types may introduce an error in the damping of the permanent-magnet assembly. For this reason, it is desirable that adequate shielding against such fields be included in the permanent-magnet assembly. It should be noted further that it is undesirable to vary the flux distribution in certain permanent-magnet material. Such a variation in flux distribution may permanently affect the magnetization of the permanent magnet involved. It is also desirable that the permanent-magnet assembly be compact and rigid in construction, and that it be capable of low cost manufacture and servicing.

In the prior art, permanent magnets for damping assemblies have been constructed of both low and high coercive materials. As examples of permanent-magnet assemblies suitable for permanent magnets constructed of low coercive material, reference may be made to the Lauffer Patent 1,834,049 and the Wey Patent 2,308,756. Tungsten and chromium permanent-magnet steels are of the low coercive type. An example of a permanent-magnet damping assembly utilizing a high coercive material is found in my Patent 2,284,893.

Numerous procedures have been adopted in the prior art for adjusting the degree of damping introduced by a permanent-magnet damping assembly. For example, a magnetic shunt has been employed for shunting magnetic flux away from the associated watthour meter disc. Such a shunt is very satisfactory for low coercive permanent-magnet materials but it is difficult to obtain with the usual shunt an adequate range of adjustment for high coercive permanent-magnet materials.

As shown in my aforesaid patent, it is possible to adjust a permanent-magnet damping assembly by varying a gap in series with the permanent magnet for the purpose of adjusting the magnetic reluctance offered to the flow of magnetic flux produced by the associated permanent magnet. With such an adjustment an adequate range of adjustment is obtainable.

As a further example of adjustment suitable for permanent-magnet damping assemblies, reference may be made to the adjustment of the permanent-magnet damping assembly bodily in a radial direction relative to the axis of rotation of the watthour meter disc. Unfortunately commercially available permanent-magnet damping assemblies which are adjustable in this manner lose their adjustment when the permanent-magnet damping assembly is removed from the associated watthour meter for servicing or other purposes.

In accordance with the invention, a permanent-magnet damping assembly is provided wherein a permanent magnet has a fixed magnetic armature associated therewith. This armature includes a nonmagnetic gap which is shunted by an adjustable magnetic shunt. It should be noted that such a shunt does not divert magnetic flux away from the associated watthour meter disc, but does change the amount of magnetic flux cutting the disc. In a preferred embodiment of the invention, a permanent-magnet damping assembly includes a magnetic shield and an electroconductive shield which protect the permanent magnet from external direct and alternating magnetic fields. In accordance with a further aspect of the invention, the permanent-magnet damping assembly is adjustable radially with respect to the axis of rotation of the associated watthour meter disc and is removable from the associated watthour meter without loss of adjustment thereof. The invention also contemplates the utilization of deformable material for uniting a permanent magnet and an associated magnetic shield in a rigid assembly. Alternatively, a wedge, including suitable temperature compensating material, may be employed for securing a permanent magnet to the associated portions of a permanent-magnet damping assembly.

It is, therefore, an object of the invention to provide an improved permanent-magnet assembly.

It is a further object of the invention to provide a permanent-magnet assembly wherein a fixed armature having a nonmagnetic gap is associated with a permanent magnet, and wherein an adjustable magnetic shunt is provided for bridging the nonmagnetic gap.

It is a further object of the invention to provide an electroconductive holder constructed of material which may be deformed for rigidly uniting a permanent magnet to other parts of a permanent-magnet damping assembly.

It is a still further object of the invention to provide a permanent-magnet damping assembly which is adjustable radially with respect to the axis of an associated watthour meter disc and which may be removed from operative position relative to the watthour meter disc without loss of calibration.

Figure 3:
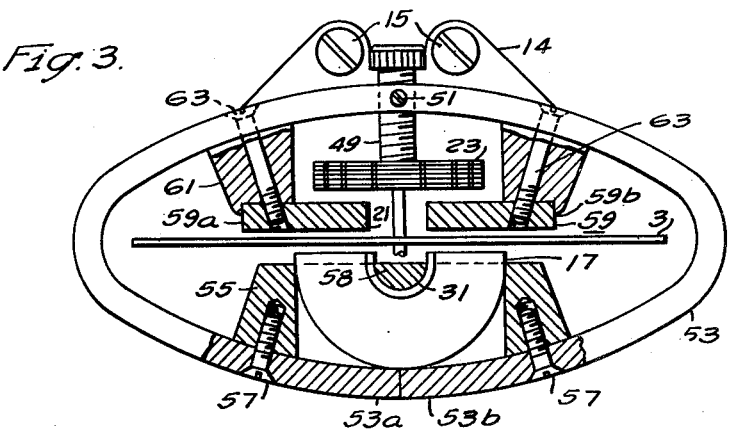
Figure 4:
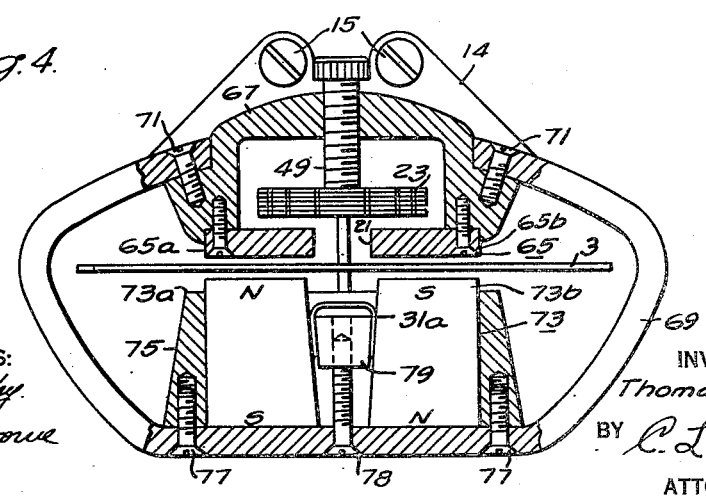

Other objects of the invention will be apparent from the following description taken in conjunction with the accompanying drawings, wherein:

Figure 1 is a view in side elevation of a watthour meter having a permanent-magnet damping assembly associated therewith, Fig. 2 is a view in front elevation with parts broken away of a permanent-magnet damping assembly suitable for the watthour meter of Fig. 1, Figs. 3 and 4 are views in front elevation with parts broken away showing modified forms of permanent-magnet damping assemblies suitable for the watthour meter of Fig. 1, Figs. 5 and 7 are views in section showing modified permanent-magnet structures.

Fig. 6 is a view in section taken on the line VI—VI of Fig. 5,

Fig. 8 is a view in front elevation with parts broken away showing a suitable adjustment for a permanent-magnet damping assembly, Fig. 9 is a view in top plan with parts broken away of the adjustment illustrated in Fig. 8, Fig. 10 is a view in front elevation with parts broken away showing a further modification of a permanent-magnet damping assembly suitable for the watthour meter of Fig. 1, and Fig. 11 is a view in top plan with parts broken away showing the permanent-magnet damping assembly of Fig. 10.

Referring to the drawings, Fig. 1 shows a supporting structure 1 having an electroconductive disc 3 mounted for rotation relative thereto by means of suitable bearing screws 5. The mechanism associated with the disc 3 may be employed for any suitable purpose, but as previously pointed out, it will be assumed to be a watthour meter. The watthour meter includes an electromagnet 7 having a voltage winding 9 and a current windings 11 associated therewith for producing a shifting magnetic field when energized. This shifting magnetic field produces rotation of the electroconductive disc 3 in a manner well understood in the art.

The disc 3 also has associated therewith a damping magnet assembly 13 having a bracket 14 which conveniently may be detachably secured to the supporting structure 1 by means of machine screws 15. As well understood in the art, the damping assembly 13 provides a magnetic field through which the electroconductive disc 3 rotates. The purpose of the damping assembly is to retard rotation of the disc.

As shown in Fig. 2, the damping assembly 13 includes a U-shaped permanent magnet 17 which may be constructed of any desired material. Conveniently, the permanent magnet may be constructed of a high coercive material such as a cobalt steel containing approximately 36% cobalt, or such as an iron alloy containing approximately 20% aluminum, 12% nickel and 5% cobalt. The permanent magnet 17 has spaced therefrom a fixed magnetic armature 19 which may be constructed of a magnetically soft iron or steel. The magnetic armature 19 has a nonmagnetic gap 21 which divides the armature into two rectangular portions 19a and 19b. The portion 19a is spaced from one pole face 17a of the permanent magnet to define a first air gap 21a for the electroconductive disc 3. The portion 19b is spaced from a second pole face 17b of the permanent magnet to define a second air gap 21b for the disc 3.

For the purpose of establishing a nonmagnetic gap, the portions 19a and 19b may be spaced by any non-magnetic material, such as brass. However, it will be assumed that the nonmagnetic gap is an air gap.

Polarity markings for the north pole N and the south pole S of the permanent magnet are indicated in Fig. 2. With the polarities as indicated, magnetic flux from the north pole crosses the disc 3 into the portion 19a of the magnetic armature. The magnetic flux then crosses the gap 21 into the portion 19b of the magnetic armature and returns to the south pole of the permanent magnet through the disc 3.

As previously pointed out, it is desirable that damping magnets be provided with a suitable adjustment. Such an adjustment is provided in Fig. 2 by a magnetic disc or shunt 23. This shunt is formed of a material having a lower reluctance to magnetic flux than that offered by the gap 21. Conveniently, the magnetic shunt 23 may be formed of a plurality of laminations of magnetically soft iron or steel which are suitably united to each other.

It should be noted that the magnetic shunt does not shunt magnetic flux away from the air gaps 21a and 21b. As the magnetic shunt approaches the magnetic armature 19, it establishes a path of relatively low reluctance across the gap 21 and thereby tends to increase the magnetic field intensity between the magnetic armature and the permanent magnet 17. For this reason, movement of the magnetic shunt serves to adjust the damping effect of the damping-magnet assembly. Since the magnetic armature 19 is in fixed position with respect to the permanent magnet 17, movement of the magnetic shunt 23 does not affect appreciably the flux distribution within the permanent magnet 17 or between the magnetic armature 19 and the permanent magnet 17. This is particularly desirable for high coercive permanent magnets.

For uniting the permanent magnet, magnetic armature and shunt in a compact and rigid assembly, a holder 25 is provided for the permanent magnet 17. This holder may be cast around the permanent magnet 17, if desired, but conveniently the holder may be provided with an opening 27 for receiving the permanent magnet. A strut 29 extends across the opening between the legs of the permanent magnet 17 to prevent movement of the permanent magnet relative to the holder in a downward direction, as viewed in Fig. 2. In effect, the holder is a pair of "trousers" for receiving the legs of the permanent magnet 17.

Any suitable material may be employed for the holder 25. If desired, it may be constructed from a nonmetallic material, such as a phenolic resin. Preferably, however, it is formed from an electroconductive material, such as an aluminum die casting alloy which may be cast in the desired shape. When an electroconductive material is employed, the material offers shielding against external alternating electromagnetic fields in the manner discussed in my aforesaid patent.

It is conventional practice to provide damping magnets with temperature compensation. Such temperature compensation may be provided in the embodiment of Fig. 2 by a strip of temperature compensating material 31 which is interposed between the permanent magnet and the strut 29. As well understood in the art, such a strip may be constructed of an iron alloy containing approximately 30% nickel which has a coefficient of permeability which varies as a function of temperature.

By constructing the holder 25 of a deformable material, the problem of properly positioning the various parts is simplified. For example, the strut 29 has two edges in engagement with the permanent magnet or with the strip 31 interposed therebetween. If the strut 29 is of deformable material, such as the aforesaid alloy, the permanent magnet 17 may be forced downwardly against the resistance of the strut 29 until the pole pieces 17a and 17b are properly positioned with respect to the holder. During the relative movement between the permanent magnet 17 and the holder, the edges of the strut 29 are deformed and in the final positions of the parts, the strut 29 properly locates the permanent magnet 17 with respect to the holder.

In order to retain the permanent magnet 17 in the holder, portions of the holder may be deformed into engagement with the permanent magnet. For example, deformable lips 33 and 35 may be bent from the positions illustrated in full lines to the positions illustrated in dotted lines to retain the permanent magnet 17 in the desired position relative to the holder.

Further shielding is provided by a magnetic shield 37 which may be constructed of a strap of magnetically soft iron or steel. The shield 37 may have openings for receiving two pins 39 and 41 which project integrally from the holder 25. Conveniently, the holder 25, including the pins 39 and 41, the strut 29, the lips 33 and 35 and the bracket 14 may be cast as a unit from an aluminum die casting alloy. The pins 39 and 41 may have their projecting ends deformed or peened from the position shown in full lines to the position shown in dotted lines for the purpose of rigidly attaching the shield 37 to the holder 25.

The portions 19a and 19b of the magnetic armature are separated by nonmagnetic spacers 43 and 45 from the shield 37 and are secured to the shield by means of nonmagnetic rivets 47.

If the magnetic shielding provided by the shield 37 is not required, the holder 25, the bracket 14, the shield 37, the spacer 43 and the spacer 45 may be cast as a unit employing a non-magnetic material which preferably is electroconductive. An aluminum die casting alloy is a suitable material. However, the advantages derived from constructing the shield 37 of magnetic material have been set forth.

As previously pointed out, the magnetic shunt preferably is mounted for adjustment relative to the magnetic armature 19. Such mounting may take the form of a machine screw 49 which is in threaded engagement with the shield 37. One end of the screw 49 is secured to the magnetic shunt 23. Consequently, rotation of the screw 49 relative to the shield 37 may be employed for advancing or retracting the magnetic shunt 23 relative to the magnetic armature 19 along the axis of the screw. Since the magnetic shunt 23 is of disc formation having the screw 49 disposed axially thereof, movement of the magnetic disc relative to the magnetic armature does not change appreciably the shape of the field therebetween. By selecting a screw having a large number of threads per inch, a delicate adjustment of the magnetic fields established by the permanent magnet 17 may be assured. If desired, a set screw 51 may be mounted in threaded engagement with the shield 37 for releasably securing the screw 49 in any desired position of adjustment.

It should be observed that the damping-magnet assembly may be removed from the associated watthour meter by releasing the screws 15. Such removal of the damping-magnet assembly does not alter the position of the magnetic shunt 23 relative to the magnetic armature 19. Consequently, the damping magnet may be removed and replaced without affecting the calibration of the associated watthour meter.

The surfaces of the pole faces 17a and 17b, the disc 3, the magnetic armature 19 and the magnetic shunt 23 are all parallel. This greatly simplifies the proper location of the various parts and inspection of the gaps therebetween.

If desired, the magnetic shunt and the permanent magnet 17 may be inverted from the positions illustrated in Fig. 2. Such an inversion together with certain other changes are illustrated in Fig. 3, wherein the shield 37 is replaced by a continuous magnetic shield or loop 53 which may have its ends 53a and 53b united by welding. If desired, the permanent magnet 17 may be secured to the loop 53 in any desired manner as by soldering or welding. As shown in Fig. 3, an electroconductive shield 55 surrounds the permanent magnet and is secured to the loop 53 in any suitable manner, as by machine screws 57. This shield includes a strut 58 which corresponds to the strut 29 of Fig. 2.

In Fig. 3 a magnetic armature 59 has portions 59a and 59b which correspond respectively to the portions 19a and 19b of Fig. 2. The magnetic armature 59 is spaced from the loop 53 by a spacing unit 61. Conveniently this spacing unit 61, together with the bracket 14, may be cast as a unit from a suitable nonmagnetic die casting alloy, such as an aluminum die casting alloy. The magnetic armature 59 and the loop 53 are secured to the unit 61 in any suitable manner, as by nonmagnetic machine screws 63 which are in threaded engagement with the magnetic armature 59.

It will be noted that the shunt 23 in Fig. 3 may be moved relative to the magnetic armature 59 by rotation of the screw 49. Since the magnetic shunt armature and permanent magnet of Fig. 3 cooperate in the same manner as the corresponding elements of Fig. 2, further discussion thereof is believed to be unnecessary.

Fig. 4 shows a still further modification of the damping-magnet assembly. In Fig. 4, a magnetic armature 65 has portions 65a and 65b which correspond respectively to the portions 19a and 19b of Fig. 2. The portions 65a and 65b are secured to a holder 67 of nonmagnetic material. This holder, together with the bracket 14, may be cast as a unit from a suitable nonmagnetic material, such as an aluminum die casting alloy. It will be noted that the magnetic shunt 23 has its screw 49 in threaded engagement with the holder 67.

A magnetic shield 69 is provided which corresponds to the magnetic shield 37 of Fig. 2. The magnetic shield 69 is secured to the holder 67 in any suitable manner as by machine screws 71.

A permanent magnet 73 is provided in the modification of Fig. 4 which differs somewhat from the permanent magnet 17 of Fig. 1. The permanent magnet 73 comprises two permanent-magnet parts 73a and 73b. These may have north poles N and south poles S, as indicated in Fig. 4. It will be noted that the lower pole pieces of the two parts 73a and 73b are magnetically connected through the magnetic shield 69. Consequently, the two parts 73a and 73b, together with the connecting portion of the magnetic shield correspond to the permanent magnet 17 of Fig. 2 and may be considered to form a resultant U-shaped permanent magnet. The permanent-magnet parts 73a and 73b are surrounded by a holder 75 which conveniently may be secured to the magnetic shield by machine screws 77. Conveniently, the holder 75 may be formed of an electroconductive material, such as an aluminum die casting alloy.

It will be noted that the faces of the parts 73a and 73b which are adjacent each other are inclined to provide a space therebetween which tapers from a large value adjacent the upper ends of the parts as viewed in Fig. 4 to a smaller value adjacent the lower ends of the parts. A wedge 79 is disposed between these inclined faces for the purpose of securing the parts 73a and 73b securely in operative positions. The wedge 79 may be moved into positive wedging position by means of a machine screw 78 which passes through the magnetic field 69 and is in threaded engagement with the wedge 79. A temperature compensation strip 31a corresponds to the strip 31 of Fig. 2. Conveniently, the strip 31a may be secured in position by inserting its ends between the wedge 79 and the parts 73a and 73b in the manner clearly illustrated in Fig. 4. It will be understood that in accordance with conventional practice the strip 31a extends between portions of the resulting permanent-magnet unit which are at different magnetic potentials. It is believed that the operation of the modification illustrated in Fig. 4 will be apparent from the preceding discussion of Figs. 2 and 3.

Other configurations may be employed for the permanent magnets 17 and 73. For example, a permanent magnet is shown in Fig. 5 which is of a generally U-shaped configuration. This permanent magnet has a tapered cross-section which is clearly indicated in Fig. 6. A holder 81 is provided which surrounds the permanent magnet 80 and which is secured to the magnetic shield 69 in any suitable manner as by machine screws 83. By inspection of Fig. 6, it will be noted that the holder 81 has a configuration which snugly engages the permanent magnet to retain it in mounted position. If desired, the holder 81 may be constructed of a suitable nonmagnetic material by casting the holder from an aluminum die casting alloy. A nonmagnetic spacer 85 is positioned between the permanent magnet 80 and the magnetic shield 69.

If desired, the permanent magnet 80 of Fig. 5 may be replaced by two permanent magnets 87 and 89 having north poles N and south poles S, as indicated in Fig. 7. These magnets are separated by a nonmagnetic spacer 91 which may be separate from, or integral with, the holder 81. The spacer 85 of Fig. 5 is not required for the modification of Fig. 7. The magnetic shield 69 magnetically connects the lower pole pieces of the permanent magnets 87 and 89 to provide a resultant U-shaped permanent magnet. The cross-sections of the permanent magnets 87 and 89 may be similar to the cross-section of the permanent magnet 80 which is illustrated in Fig. 6.

The magnetic shunt 23 of Figs. 2, 3 and 4 may be replaced by other shunts capable of providing the desired adjustment. For example, in Fig. 8, the permanent magnet 17 is associated with two parts 91a and 91b of a magnetic armature which corresponds to the parts 19a and 19b of Fig. 2, the parts 59a and 59b of Fig. 3 or the parts 65a and 65b of Fig. 4. However, in Fig. 8, the nonmagnetic gap 21 is provided with a magnetic shunt 93 which may be reciprocated relative to the gap 21 for the purpose of varying the degree of shunting of the gap. To this end the magnetic shunt 93 is positioned between a guide bracket 95 of nonmagnetic material and the portions 91a and 91b of the magnetic armature. A screw 97 has its head secured in the bracket 95 against axial movement of the screw relative to the bracket. For example, the bracket 95 may have a tongue 99 positioned between the head of the screw 95 and a collar 101 which is also secured to the screw. The screw 95 is in threaded engagement with the shunt 93. Consequently, rotation of the screw 95 moves the shunt 93 to vary the extent of bridging of the gap 21 thereby. The shunt 93 may be given any desired configuration to provide a linear variation in damping as a result of rotation of the screw 97 or any desired relationship between the rate of variation and rotation of the screw. If desired, a nonmagnetic spacer may be interposed between the magnetic shunt 93 and the associated magnetic armature. For example, a thin nonmagnetic spacer may be provided by copper plating the magnetic shunt 93.

As previously pointed out, radial movement of the damping-magnet assembly relative to the axis of rotation of the disc 3 may be employed either alone or in supplement to the previously discussed adjustment for the purpose of adjusting the degree of damping of the disc 3 by the damping-magnet assembly. For example, the loop 53 of Fig. 3 may be mounted for movement radially of the axis of rotation of the disc 3, as shown in Figs. 10 and 11. Although the permanent magnet 17 and the magnet shunt 23 of Fig. 3 may be located within the loop 53, a modified structure is illustrated in Figs. 10 and 11.

Referring to Figs. 10 and 11, it will be noted that the bracket 14 has two parallel guide rods 103 and 105 secured thereto. The loop 53 has secured thereto a holder 107 which is provided with two openings for snugly but slidably receiving the rods 103 and 105. In order to facilitate reciprocation of the holder 107 along the rods 103 and 105, the rod 105 may be provided with threads on its free end. A nut 109 is disposed in threaded engagement with the free end of the rod 105. This nut has a flange 111 disposed in an opening 113 provided in the holder 107. The body of the nut is received in a slot 115 also provided in the holder. The slot and opening are closed by a portion of the loop 53. Preferably the flange 111 is biased in a predetermined direction axially of the rod 105 by means of a cup-shaped spring 117 which is located in the opening 113. By inspection of Fig. 11, it will be noted that rotation of the screw 109 urges the permanent-magnet damping assembly 13 axially of the rod 105. The damping-magnet assembly may be clamped in any desired position by a set screw 119 or other means. In the specific embodiment of Figs. 10 and 11, a stirrup clamp is employed. This clamp includes a block 121 having an opening for receiving the rod 105. The block 121 is positioned in a recess 123 constructed in the holder 107. The block 121 has a screw 125 projecting therefrom which has a nut 127 in threaded engagement therewith. By rotation of the nut 127, the permanent-magnet damping assembly may be clamped on the rod 105 in any desired position of adjustment.

The permanent-magnet damping assembly of Figs. 10 and 11 includes a permanent magnet 129 which corresponds to the permanent magnet 17 of Figs. 2 and 3. This damping magnet is provided with a holder 131 which constitutes, in effect, a pair of trousers for receiving the legs of the U-shaped permanent magnet 129. The holder 131 may be formed, if desired, of an aluminum die casting alloy. A leaf spring 133 may be located between the permanent magnet 129 and the loop 53 for the purpose of urging the permanent magnet 129 into firm engagement with a strut 135 extending between the legs of the permanent magnet and forming part of the holder 131. The holder 131 is secured to the loop 53 in any suitable manner as by machine screws 137.

A second permanent magnet 139 may be associated with the holder 107 in a manner analogous to the association of the permanent magnet 129 with the holder 131. However, if a single permanent magnet suffices for the damping magnet assembly, the member 139 may be formed of magnetically soft iron or steel for the purpose of serving as a magnetic armature for the permanent magnet 129.

It will be noted that movement of the damping magnet assembly along the rods 103 and 105 in a direction radial to the axis of rotation of the disc 3 varies the torque arm of the force developed by the damping-magnet assembly. In addition, such movement varies the rate of movement of the portion of the disc 3 which is in the magnetic field supplied with magnetic flux by the permanent magnet 129. As the damping-magnet assembly is moved towards the axis of rotation of the disc 3, both of these actions tend to produce a reduction in the damping torque developed by the damping-magnet assembly. Consequently, by manipulation of the nut 109, the damping torque may be accurately adjusted.

If it is desired to remove the damping-magnet assembly from the supporting structure 1 of the modification illustrated in Figs. 10 and 11, the screws 15 may be removed. This permits the damping-magnet assembly including the bracket 14 to be removed from the associated watthour meter. Such removal does not destroy the calibration obtained by manipulation of the nut 109, and the entire unit may be replaced without requiring additional calibration of the watthour meter.

Although the invention has been described with reference to certain specific embodiments thereof, numerous modifications are possible. Therefore, the appended claims have been drafted to cover all modifications falling within the spirit of the invention.

I claim as my invention:

1. In a damping magnet assembly, a permanent magnet unit having a pair of pole faces disposed in a common plane, a magnetic armature having a substantially nonmagnetic gap dividing the magnetic armature into two magnetic elements magnetically substantially insulated from each other, each of said magnetic elements being spaced from a separate one of the pole faces to define a magnetic field therebetween, adjustable magnetic means shunting said gap, said means being adjustable for varying the magnetic flux in said magnetic fields, and magnetic shield means substantially surrounding said magnetic fields and supporting said magnetic armature in operative position relative to the permanent magnet unit.

2. In an instrument having a stator assembly, an electroconductive disc, and means mounting the disc for rotation relative to the stator assembly; a substantially U-shaped permanent magnet disposed on a first side of the disc and having two pole faces of opposite magnetic polarity disposed in a common plane adjacent and substantially parallel to a first face of the disc; a magnetic armature disposed on a second side of the disc and having a nonmagnetic gap dividing the armature into two magnetic elements magnetically substantially insulated from each other, each of said magnetic elements being spaced from a separate one of said pole faces to define a magnetic field therebetween; whereby magnetic flux from a first one of the pole faces crosses the disc to enter a first one of the magnetic elements, traverses the gap to enter a second one of the magnetic elements and finally recrosses the disc to enter a second one of the pole faces; adjustable magnetic means shunting said gap, the magnetic armature being located between the magnetic means and the disc, said means being adjustable for varying the magnetic flux in said magnetic fields; magnetic shield means substantially surrounding said magnetic fields, said magnetic shield means being secured to said permanent magnet and said magnetic armature for maintaining said permanent magnet in spaced position relative to the magnetic armature; and means securing the magnetic shield means, permanent magnet and magnetic armature to the stator assembly.

3. In a permanent magnet assembly, a permanent magnet, a nonmagnetic holder for said permanent magnet, a magnetic armature spaced from the pole faces of said permanent magnet for establishing magnetic fields between the pole faces and the magnetic armature, said magnetic armature having a nonmagnetic gap dividing the armature into two magnetically substantially insulated portions each associated with a separate one of the pole faces, a magnetic shunt for bridging said gap, a fixed magnetic shield secured to the holder and substantially surrounding said magnetic fields, said magnetic armature being secured to the magnetic shield, whereby the magnetic shield maintains said magnetic armature in fixed operative position relative to the permanent magnet, and screw means extending between the magnetic shield and the magnetic shunt, said screw means being operable for moving the magnetic shunt relative to said gap.

4. In a permanent magnet assembly, a substantially U-shaped permanent magnet, a nonmagnetic holder having a separate opening for each leg of said permanent magnet, a magnetic shield substantially surrounding the pole face of said permanent magnet, said magnetic shield having ends secured to said nonmagnetic holder in spaced relationship relative to each other and to the permanent magnet, said magnetic shield and nonmagnetic holder constituting a substantially closed loop, a magnetic armature, located between said magnetic shield and said pole faces, said magnetic armature being spaced from said pole faces for defining a magnetic field between the magnetic armature and each of said pole faces, nonmagnetic means spacing the magnetic armature from the magnetic shield, the magnetic armature having a nonmagnetic gap dividing the armature into two substantially magnetically insulated portions each associated with a separate one of the pole faces, a magnetic shunt bridging the nonmagnetic gap, and screw means extending between the magnetic shunt and the magnetic shield, said screw means being operable for moving the magnetic shunt to adjust the bridging of the gap thereby.

5. In a permanent magnet assembly, a permanent magnet, a nonmagnetic holder having an opening for receiving the permanent magnet, said holder having a deformable integral portion retaining the permanent magnet in the opening, said portion being deformable from a position permitting entry of the permanent magnet into the opening to a position retaining the permanent magnet in the opening; a magnetic shield substantially surrounding the pole faces of the permanent magnet, and means securing the magnetic shield to the holder, said means comprising an integral protuberance on the holder projecting from the holder through an opening in the magnetic shield, the end of said protuberance being deflected over the magnetic shield to secure the magnetic shield to the holder.

6. In a permanent magnet assembly, a permanent magnet, a holder constructed of nonmagnetic deformable material for receiving the permanent magnet, said holder engaging a small portion only of the surface on one side of the permanent magnet, said material and the size of said portion being selected to permit pressure exerted on the permanent magnet relative to the holder to deform the holder until the permanent magnet is accurately located relative to the holder.

7. A damping magnet assembly for damping rotation of an electroconductive disc, said magnet assembly comprising a U-shaped permanent magnet, and a magnetic armature spaced from the pole faces of the permanent magnet to define a magnetic field between the magnetic armature and each of said pole faces within which an electroconductive disc may be mounted for rotation; an electroconductive, nonmagnetic holder having an opening for receiving the permanent magnet; said holder including a unitary strut positioned between the legs of the permanent magnet and having a first deformable portion engaging a small area of the permanent magnet for preventing passage of the permanent magnet in one direction through the opening, and a second deformable unitary portion cooperating with the first deformable portion for preventing movement of the permanent magnet from the holder; a magnetic strap having spaced ends associated with the holder, said holder having deformable portions positioned to prevent movement of the strap relative to the holder, said magnetic strap and the holder constituting a loop substantially surrounding the magnetic armature; nonmagnetic means supporting and spacing the magnetic armature from the magnetic strap; said magnetic armature having a nonmagnetic gap dividing the armature into two portions each associated with a separate one of said pole faces and magnetically substantially insulated from each other, a magnetic disc for shunting said nonmagnetic gap, and screw means supported by the magnetic strap for moving the magnetic disc along the axis of said disc for adjusting the strengths of the magnetic fields.

8. In an instrument, a supporting structure; a bracket detachably secured to the supporting structure, said bracket including guide means projecting therefrom, a magnet assembly comprising a permanent magnet, and means cooperating with the permanent magnet for defining an air gap supplied with magnetic flux by said permanent magnet, said magnet assembly and guide means having interfitting parts in slidable engagement for guiding the magnet assembly along the guide means for adjustment, and screw means for moving said magnet assembly along said guide means to adjust the position thereof relative to the supporting structure, whereby the bracket and magnet assembly may be removed and replaced as a unit relative to the supporting structure without destroying the adjustment of the magnet assembly.

9. In a meter, an electroconductive disc, a supporting structure, means mounting the disc for rotation relative to the supporting structure, a bracket detachably secured to the supporting structure, said bracket including a pair of spaced, parallel guide members projecting therefrom, a magnet assembly comprising a permanent magnet, and means cooperating with the permanent magnet for establishing a magnetic field within which the disc is mounted for rotation, said magnet assembly having a pair of spaced openings each positioned and proportioned for receiving snugly and slidably a separate one of the guide members, and screw means connecting said magnet assembly and one of said guide members, said screw means being operable for moving said magnet assembly along said guide members.

10. In a meter, an electroconductive disc, a supporting structure, means mounting the disc for rotation relative to the supporting structure, a bracket detachably secured to the supporting structure, said bracket including a pair of spaced, parallel guide members projecting therefrom, a magnet assembly comprising a permanent magnet, and means cooperating with the permanent magnet for establishing a magnetic field within which the disc is mounted for rotation, said magnet assembly having a pair of spaced openings each positioned and proportioned for receiving snugly and slidably a separate one of the guide members, and screw means connecting said magnet assembly and one of said guide members, said screw means being operable for moving said magnet assembly along said guide members, said screw means comprising screw threads on one of said guide members, a nut in threaded engagement with said screw threads, said nut and said magnet assembly having interfitting parts permitting rotation of the nut about its axis relative to the magnet assembly, and preventing axial movement therebetween, and spring means biasing the nut in a predetermined direction along said axis relative to the magnet assembly.

11. In a magnet assembly, a permanent magnet unit comprising a pair of legs having their adjacent surfaces inclined relative to each other, a holder for said permanent magnet, a wedge member engaging said surfaces at points of differing magnetic potential, and means urging said wedge in a direction relative to the holder such that the wedge forces the permanent magnet into firm engagement with the holder, said wedge comprising magnetic material having a temperature coefficient of permeability selected to provide a predetermined temperature correction for said permanent magnet unit.

12. The method of constructing a permanent magnet assembly which comprises inserting the legs of a U-shaped permanent magnet into trousers of deformable material, placing a magnetic shield substantially around the permanent magnet and adjacent the trousers, and deforming the trousers to associate rigidly and irremovably the permanent magnet, the magnetic shield and the trousers.

13. In a permanent magnet assembly, a permanent magnet unit having a pair of pole faces disposed in a common plane, a magnetic armature unit having a substantially nonmagnetic gap dividing the magnetic armature into two magnetic elements magnetically substantially insulated from each other, each of the magnetic elements being spaced from a separate one of the pole faces to define a magnetic field therebetween, a loop substantially surrounding said magnetic fields, said loop having a first section of major extent constructed of soft magnetic material and a second section of minor extent constructed of nonmagnetic material connecting the ends of the soft magnetic material, a first one of said units being secured to the first section and a second one of the units being secured to the second section.

14. In a permanent magnet assembly, a permanent magnet unit having a pair of pole faces disposed in a common plane, a magnetic armature unit having a substantially nonmagnetic gap dividing the magnetic armature into two magnetic elements magnetically substantially insulated from each other, each of the magnetic elements being spaced from a separate one of the pole faces to define a magnetic field therebetween, a loop substantially surrounding said magnetic fields, said loop being constructed substantially of soft magnetic material, means securing said units to said loop, a magnetic shunt located between said magnetic armature unit and the loop for shunting magnetic flux across said gap, and screw means extending between the magnetic shunt and the loop for adjusting the magnetic shunt relative to the magnetic armature unit.

15. In a permanent magnet assembly, a permanent magnet unit having a pair of pole faces disposed in a common plane, a magnetic armature unit having a substantially non-magnetic gap dividing the magnetic armature into two magnetic elements magnetically substantially insulated from each other, each of the magnetic elements being spaced from a separate one of the pole faces to define a magnetic field therebetween, a loop substantially surrounding said magnetic fields, a soft magnetic shunt for shunting magnetic flux, said magnetic armature unit being located substantially between the magnetic shunt and the pole faces of the permanent magnet.

THOMAS D. BARNES.

REFERENCES CITED

The following references are of record in the file of this patent:

UNITED STATES PATENTS

| Number | Name | Date |
| --- | --- | --- |
| Re. 20,291 | Bock | Mar. 9, 1937 |
| 706,982 | Menges | Aug. 12, 1902 |
| 1,686,727 | Bradshaw | Oct. 9, 1928 |
| 2,196,898 | Faus | Apr. 9, 1940 |
| 2,252,483 | Green | Aug. 12, 1941 |
| 2,284,893 | Barnes | June 2, 1942 |
| 2,307,205 | Ewald et al. | Jan. 5, 1943 |
| 2,401,730 | Green | June 11, 1946 |

FOREIGN PATENTS

| Number | Country | Date |
| --- | --- | --- |
| 453,262 | Great Britain | Sept. 8, 1936 |
| 566,011 | Great Britain | Dec. 8, 1944 |